United States Patent [19]

Tashiro et al.

[11] 4,022,627

[45] May 10, 1977

[54] CRYSTALLIZABLE GLASSES AND NEPHETINE GLASS-CERAMICS CONTAINING $ZrO_2$ AND ZnO

[75] Inventors: Megumi Tashiro, Kyoto; Masamichi Wada, Otsu; Toshio Yamanaka, Kyoto; Kenichi Tani, Otsu, all of Japan

[73] Assignee: Owens-Illinois, Inc., Toledo, Ohio

[22] Filed: Apr. 6, 1971

[21] Appl. No.: 131,813

Related U.S. Application Data

[63] Continuation of Ser. No. 18,795, March 16, 1970, abandoned, which is a continuation of Ser. No. 522,069, Jan. 21, 1966, abandoned.

[30] Foreign Application Priority Data

Jan. 27, 1965  Japan ..................... 40-4381

[52] U.S. Cl. ................ 106/39.6; 106/39.7; 106/39.8; 106/52; 106/53; 65/33
[51] Int. Cl.² ................................. C03C 3/22
[58] Field of Search ........ 65/33; 106/39.6, 39 DV, 106/52, 39.8

[56] References Cited

UNITED STATES PATENTS

| 2,920,971 | 1/1960 | Stookey | 106/39 DV |
| 3,006,775 | 10/1961 | Chen | 106/39 DV |
| 3,146,114 | 8/1964 | Kivlighn | 106/39 DV |
| 3,201,266 | 8/1965 | MacDowell | 106/39 DV |
| 3,236,662 | 2/1966 | MacDowell | 106/52 X |
| 3,252,811 | 5/1966 | Beall | 106/39 DV |
| 3,282,712 | 11/1966 | Tashiro et al. | 106/39 DV |
| 3,313,609 | 4/1967 | Megles | 106/39 DV |
| 3,455,706 | 7/1969 | Takagi et al. | 106/39.6 |
| 3,473,937 | 10/1969 | Tashiro et al. | 106/39.8;39 DV |
| 3,528,828 | 9/1970 | Smith | 106/39 DV |
| 3,586,521 | 6/1971 | Duke | 106/39.8 |
| 3,720,526 | 3/1973 | Duke et al. | 106/39.6 |

FOREIGN PATENTS OR APPLICATIONS 1,099,135  1961  Germany ............... 106/39 DV

OTHER PUBLICATIONS

Vanes—"Crystallization Studies of $Na_2O$–$Al_2O_3$–$SiO_2$ Base Glasses"—Advances in Glass Technology pub. 1962, NYC. Plenum Press, pp. 377–381.
Leim et al., *Phase Diagrams for Ceramists* pub. 1964 by J. Amer. Cer. Soc. FIG. 501, System $Na_2O$–$Al_2O_3$–$SiO_2$.

J. Ceramic Raw Materials, in Ceramic Industry Magazine, Chicago, 1967, p. 153.

*Primary Examiner*—Helen M. McCarthy
*Attorney, Agent, or Firm*—Charles S. Lynch

[57] ABSTRACT

A thermally crystallizable glass consisting essentially of 45–57 $SiO_2$, 29–38 $Al_2O_3$, 13–22 $Na_2O$, in parts by weight, and the parts totalling 100. For each of these 100 parts, the glass contains 0.5–5 parts of $ZrO_2$ and 1–10 parts of ZnO. The five constituents constitute at least 95 weight percent of the total glass and a thermally crystallized glass-ceramic article suitable as kitchen ware or table ware is made from this glass.

2 Claims, No Drawings

CRYSTALLIZABLE GLASSES AND NEPHETINE GLASS-CERAMICS CONTAINING $ZRO_2$ AND ZNO

This application is a continuation of Ser. No. 18,795 filed Mar. 16, 1970 which is a continuation of Ser. No. 522,069 filed Jan. 21, 1966, both abandoned.

This invention pertains to a method of manufacturing glass-ceramics having a higher mechanical strength and a higher softening temperature than the initial glass, by heating the glass body consisting essentially of $SiO_2$, $ZrO_2$, $Al_2O_3$, $Na_2O$ and ZnO to crystallize the major portion of the components, forming fine crystals.

There are several methods of producing glass-ceramics containing a large amount of $Na_2O$. Patent SHO-37-1123 corresponding to U.S. Pat. No. 2,933,857 describes a method in which a glass body containing 0–5% of F by weight is used as a nuclei forming agent. Patent SHO-38-10725 describes a method in which a glass body containing 1–5% by weight of ZnS is used as a nuclei forming agent. Patent SHO-36-16032 describes a method in which 0.08–0.5% by weight of $Cr_2O_3$ or at least 6% by weight of titanate of a divalent metallic oxide is used.

However, the present inventors discovered that the following new glasses of limited composition containing $SiO_2$, $Al_2O_3$, $Na_2O$ as the chief components and $ZrO_2$ and ZnO as the nuclei forming agent, can be transformed into new and useful glass-ceramics having a high softening temperature and high mechanical strength by thermal crystallization.

This invention in one aspect pertains to a method of manufacturing a glass-ceramic and glass-ceramic articles having a higher softening temperature and a higher mechanical strength than the initial glass, by heat treating a glass body consisting essentially by weight of 45–57 parts $SiO_2$, 29–38 parts $Al_2O_3$, 13–22 parts $Na_2O$, and in excess over the 100 parts of the sum of the above components including as a nucleating agent by weight of 0.5 parts to 5 parts $ZrO_2$ and 1–10 parts ZnO, the total of the above essential components being at least 95% of the glass body, by heating it at the temperature between the annealing point and the softening point of the initial glass, for example, 700°–800° C, to form the crystal nuclei; then the heating is continued with the gradual increase of the temperature, for example, at the increasing rate of 5° C/minute, then by keeping it finally at the temperature of 900°–1150° C for 0.5–10 hours.

The application of this invention is shown in Table 1.

In making the glasses described herein, it will be understood that standard batch materials can be used, such as silica sand ($SiO_2$), alumina ($Al_2O_3$), soda ash (for $Na_2O$), zircon (for $ZrO_2$, $SiO_2$), $TiO_2$, potash (for $K_2O$), ZnO, periclase (for MgO), aluminum or sodium phosphate (for $P_2O_5$), $CaCO_3$ (for CaO), and red lead (for PbO).

Batches of glass were prepared so as to have the composition specified in Table 1. These batches of glass were fused for 7–8 hours at a temperature of 1500°–1550° C in an electric oven. A number of glass rods of each composition were made, about 5 mm. in diameter. The glass rods of Examples 1–11 were kept at a temperature of 800° C for 2 hours in an electric oven to form the crystal nuclei. After this the rods were further heated at the rate of 5° C/minute up to a temperature of 1100° C, and then held at that temperature for 2 hours in order to increase the amount of fine crystals. The heat treatment was the same for Examples 12–17 except that the second holding temperature was 1050° C. In Example 18 the first holding temperature for 2 hours was 750° C and the second 2 hour holding temperature was 1000° C.

It was confirmed by the X-ray analysis that the main crystals separated by such thermal crystallization heat treatment were nepheline. The bending strength (modulus of rupture) shown in Table 1 was obtained by measurement with a bending strength measuring device which is supported by 3 points and has a span of 40 mm. The specimens were crystallized rods of about 50 mm. length and 5 mm. diameter.

The reason for limiting the components $ZrO_2$, $SiO_2$, $Al_2O_3$, ZnO and $Na_2O$ to a certain percentage is as follows. If $ZrO_2$ is less than 0.5 parts, the fine-grained

TABLE I

| Constituent | 1 | 2 | 3 | 4 | 5 | 6 | 7 | 8 | 9 |
|---|---|---|---|---|---|---|---|---|---|
| $SiO_2$ | 47 | 48 | 50 | 51 | 54 | 50 | 50 | 50 | 55 |
| $Al_2O_3$ | 35 | 34 | 34 | 32 | 30 | 34 | 33 | 34 | 29 |
| $Na_2O$ | 18 | 18 | 16 | 17 | 16 | 16 | 17 | 16 | 16 |
| $ZrO_2$ | 4 | 4 | 2 | 1 | 1 | 1 | 1 | 1 | 1 |
| ZnO | 8 | 5 | 6 | 2 | 2 | 2 | 2 | 2 | 2 |
| $TiO_2$ | — | — | — | 3 | 3 | 3 | 3 | 3 | 3 |
| MgO | — | — | — | — | — | — | — | 2 | — |
| $K_2O$ | — | — | — | — | — | 1 | — | — | — |
| PbO | — | — | — | — | — | — | — | — | — |
| $P_2O_5$ | — | — | — | — | — | — | — | — | — |
| CaO | — | — | — | — | — | — | — | — | — |
| Bending strength (kg/cm²) | 1175 | 1365 | 1070 | 2115 | 1860 | 1225 | 2300 | 1810 | 2170 |

| Constituent | 10 | 11 | 12 | 13 | 14 | 15 | 16 | 17 | 18 |
|---|---|---|---|---|---|---|---|---|---|
| $SiO_2$ | 52 | 52 | 52 | 52 | 52 | 52 | 54 | 54 | 54 |
| $Al_2O_3$ | 31 | 31 | 31 | 31 | 31 | 31 | 29.5 | 29.5 | 29.5 |
| $Na_2O$ | 17 | 17 | 17 | 17 | 17 | 17 | 16.5 | 16.5 | 16.5 |
| $ZrO_2$ | 1 | 1 | 1 | 1 | 1 | 1 | 1 | 1 | 1 |
| ZnO | 2 | 2 | 2 | 2 | 3 | 4 | 2.5 | 2.5 | 2.5 |
| $TiO_2$ | 3 | 3 | 3 | 3 | 3 | 3 | 3 | 3 | 3 |
| MgO | — | — | — | — | — | — | — | — | — |
| $K_2O$ | — | — | — | 2 | — | — | — | — | — |
| PbO | 2 | — | — | — | — | — | — | 1 | 0.5 |
| $P_2O_5$ | — | 2 | — | — | — | — | — | — | 0.5 |
| CaO | — | — | 2 | — | — | — | — | — | — |
| Pending strength (kg/cm²) | 1870 | 1980 | 1330 | 2020 | 1650 | 1480 | 1260 | 1580 | 1210 | glass-ceramic is very difficult to produce, and if $ZrO_2$ is greater than 5 parts, the liquidus temperature of glass becomes very high, and the molding of glass becomes difficult. Therefore, $ZrO_2$ must be limited to 0.5–5 parts. If ZnO is less than 1 part or more than 10 parts, the finely crystalline glass-ceramics cannot be produced. Therefore, ZnO must be limited to 1–10 parts. If $SiO_2$ is less than 45 parts, the chemical resistance of glass-ceramic becomes inferior, and if $SiO_2$ is more than 57 parts, the thermal crystallization of the glass takes place only with difficulty. Therefore, $SiO_2$ must be limited to 45–57 parts. If $Al_2O_3$ is less than 29 parts, the finely crystallized glass-ceramic cannot be produced, and if $Al_2O_3$ is more than 38 parts, the liquidus temperature of the glass becomes high. Therefore, $Al_2O_3$ must be limited to 29–38 parts. If $Na_2O$ is less than 13 parts, the thermal crystallization of the glass takes place with difficulty, and if $Na_2O$ is more than 22 parts, the finely crystalline glass-ceramic cannot be obtained. Therefore, $Na_2O$ must be limited to 13–22 parts. Moreover, if the above mentioned $SiO_2$, $Al_2O_3$, $Na_2O$, $ZrO_2$ and ZnO (total) are less than 95% of the glass, softening deformation during the crystallizaton becomes great. Therefore, according to the invention the sum of $SiO_2$, $Al_2O_3$, $Na_2O$, $ZrO_2$ ZnO contained in the glass is at least 95% by weight.

Glass (and resulting glass-ceramic) compositions of the present invention having the best properties, notably with respect to fineness of crystals and strength, contain at least 3.5 weight percent $ZrO_2$ or of $ZrO_2$ plus $TiO_2$, based on the total glass composition.

Miscellaneous oxides can be added to the compositions of the invention so long as they do not materially affect or alter the basic characteristics of the glasses and the glass-ceramic materials of the invention. For instance, based on 100 parts by weight of $SiO_2 + Al_2O_3 + Na_2O$, up to 3 parts each of $Li_2O$, $K_2O$, CaO or $TiO_2$, or less than 3 parts MgO, or less than 2 parts BaO can be included. Also, addition of up to about 2 parts of PbO improves chemical durability and up to about 2 parts of $P_2O_5$ reduces the tendency of articles of large cross-sectional area to crack during heat treatment.

According to this invention, since glass-ceramics having a high mechanical strength and a fine structure can be produced economically, the final products are suitable for use as industrial material or for the production of kitchen utensils or tableware.

We claim:

1. A thermally crystallizable glass consisting essentially of 45–57 parts $SiO_2$, 29–38 parts $Al_2O_3$, 13–22 parts $Na_2O$, said parts being based on 100 parts of $Sio_2$, $Al_2O_3$ and $Na_2O$, and for each 100 parts of $SiO_2$, $Al_2O_3$ and $Na_2O$, 0.5–5 arts of $ZrO_2$ and 1–10 parts of ZnO, wherein said essential $SiO_2$, $Al_2O_3$, $Na_2O$, $ZrO_2$, and ZnO constituents constitute at least 95 weight percent of the total glass, additionally containing 0–3 parts by weight of $TiO_2$ for each 100 parts by weight of $SiO_2 + Al_2O_3 + Na_2O$, the total of the weight percent $ZrO_2 +$ the weight percent $TiO_2$ being at least 3.5 based on the total glass composition, said glass being capable of in situ thermal crystallization to form a glass ceramic containing nepheline crystals.

2. A glass-ceramic containing nepheline crystals formed by thermal crystallization of a glass consisting essentially of in parts by weight 45–57 $SiO_2$, 29–38 $Al_2O_3$, 13–22 $Na_2O$, said parts being based on 100 parts of $SiO_2$, $Al_2O_3$ and $Na_2O$, and for each 100 parts of $SiO_2$, $Al_2O_3$ and $Na_2O$, 0.5–5 parts of $ZrO_2$ and 1–10 parts of ZnO, wherein said essential $SiO_2$, $Al_2O_3$, $Na_2O$, $ZrO_2$ and ZnO constituents constitute at least 95 weight percent of the total glass-ceramics, and additionally containing 0–3 parts by weight of $TiO_2$ for each 100 parts by weight of $SiO_2 + Al_2O_3 + Na_2O$, the total of the weight percent $ZrO_2 +$ the weight percent $TiO_2$ being at least 3.5, based on the total glass composition.

* * * * *